United States Patent
Ranade et al.

[11] Patent Number: 6,000,241
[45] Date of Patent: Dec. 14, 1999

[54] PROCESS FOR MAKING BARIUM CONTAINING SILICATE GLASS POWDERS

[75] Inventors: Madhav B. Ranade, Bethesda; Rohitha K. Wijayatilleke, Glen Bunie; M. Kamal Akhtar; Geoffrey J. Varga, both of Ellicott City, all of Md.

[73] Assignee: Particle Technology, Inc., Beltsville, Md.

[21] Appl. No.: 09/140,013

[22] Filed: Aug. 26, 1998

[51] Int. Cl.[6] .............................. C03B 8/00; C03B 19/06
[52] U.S. Cl. ............................. 65/17.2; 65/17.4; 65/21.1; 264/9; 501/27
[58] Field of Search ..................... 65/17.2, 17.4, 65/21.1, 134.1; 501/12, 27; 264/9

[56] References Cited

U.S. PATENT DOCUMENTS

| | | |
|---|---|---|
| 2,935,375 | 5/1960 | Boucher ........................... 23/2 |
| 4,220,582 | 9/1980 | Orlowski et al. ................. 260/42.28 |
| 5,061,682 | 10/1991 | Aksay et al. ..................... 505/1 |
| 5,176,732 | 1/1993 | Block et al. ..................... 65/21.4 |
| 5,358,695 | 10/1994 | Helble et al. .................... 423/592 |
| 5,616,165 | 4/1997 | Glicksman et al. ............... 75/369 |

*Primary Examiner*—Stanley S. Silverman
*Assistant Examiner*—Jacqueline A. Ruller
*Attorney, Agent, or Firm*—Roylance, Abrams, Berdo & Goodman, L.L.P.

[57] ABSTRACT

A precursor solution composition is provided for making highly pure, fine barium-containing silicate glass powders and specifically barium aluminoborosilicate (BABS) glass powders. An atomized precursor solution containing colloidal silica, a water soluble source of barium, boric acid, and aluminum nitrate is used to make the powders. After mixing, the liquid precursor solution is formed into fine droplets, classified for size, and pyrolyzed into fine powders. The resulting spherical particles of the BABS glass is in the 0.1 to 10 micrometer size range.

16 Claims, 3 Drawing Sheets

1

PROCESS FOR MAKING BARIUM CONTAINING SILICATE GLASS POWDERS

FIELD OF THE INVENTION

The invention relates to the preparation of a stable precursor solution and production of barium containing silicate glasses therefrom.

BACKGROUND OF THE INVENTION

Barium containing silicate glasses exhibit excellent strength and a high refractive index as well as particularly desirable density, refractive index, and stability for dental composites. In a typical dental procedure, glass powder (usually $\leq 1$ μm and appropriate refractive index) and liquid monomer are mixed to prepare a thick paste. This paste is then molded into a desired shape, and the monomer exposed to ultraviolet or visible radiation. The result is a durable dental surface with an optical appearance that corresponds with the surrounding tooth surfaces.

One early method for preparing barium-containing silicate powders is by grinding a bulk mixture of oxides and carbonates. Unfortunately, the resulting powder is irregular in shape with a broad particle size distribution. The grinding process also can lead to undesirable contamination. The art looked for ways to produce spherical glass powders economically and in quantity.

Spherical powder is much preferred over irregular particles. The first is flow: the uncured pastes made with spherical particles flow better than those made using irregular particles of same weight fraction glass. As a result, the solids content of the mixture may be increased while retaining comparable flow properties.

Pyrolysis of an atomized liquid spray of precursor solution was one useful method for producing generally spherical particles. In such a process, a precursor solution containing the elements desired in the final glass is atomized to produce an aerosol (or a mist). The aerosol particles are then dried by evaporation of the solvent and heated to a temperature sufficiently high to convert the precursor compounds to the product glass particles. The particle size distribution of the resulting powder was controlled by a combination of aerosol size distribution, the solute content and by mechanical separators. Glass powders of regular, generally spherical shape could be produced with particle sizes in the micron and submicron range. The need for further grinding was eliminated with the corresponding source of potential contamination.

Spray pyrolysis processes require a stable source of liquid precursor solution. In addition, the cost of the precursor solution must be within certain limits for economic production, and the precursor should be reasonably safe to handle. These competing requirements have posed certain obstacles for the production of barium-containing silicate glass powders by spray pyrolysis and for barium aluminoborosilicate (BABS) glass powders in particular.

Previous attempts to produce a stable precursor of BABS solution have included various combinations of acetates, nitrate, or chlorides. Such solutions were hampered by precipitation of one or more components leading to cloudy particles that exhibited a gritty internal structure which was unsuitable for use in dental composites. Later attempts required use of silicon alkoxide and barium perchlorate. Unfortunately, silicon alkoxide is an expensive source of silica and is flammable. The barium perchlorate is also expensive and not readily available.

It would be desirable to have a precursor solution for BABS powders that was mote cost effective, nonflammable, and more commercially available than the previous silicon alkoxide/barium perchlorate system.

It is desirable for the preparation of BABS powders that the particle size of the final powder be in the range of 0.1–2 μm. This final size range dictates that the droplet size be within the range of 0.3–9 μm, i.e., 3–4 times the final glass particle size. Conventional atomization techniques for producing droplets in such a size range require the use of pneumatically assisted nozzles.

But not all pneumatically assisted nozzles are commercially practical. Pneumatic nebulizers that are often used in respiratory therapy require large volumes of carrier gas and require an aerodynamic separator such as an impactor or a cyclone to remove droplets larger than 8 μm. A more advantageous ratio of droplet volume to carrier gas volume is needed to minimize energy costs associated with heating large volumes of carrier gas.

Other options for producing small droplets include high frequency (about 1–3 MHz) ultrasonic nebulizers and very high pressure jets. No gas is used in atomization, but only as a carrier to transport the droplets to the reactor. Ultrasonic and other such acoustic nebulizers are commercially available that can reach droplet concentrations as high as $10^7$ particles/$cm^3$.

Another method is discussed in Aksay et al (U.S. Pat. No. 5,061,682). This patent describes a method to produce mixed oxide particles in the micrometer size range. Conventional spray nozzles are used to produce the spray containing the precursor compounds in solution with an ignitable compound. The combustion of the ignitable compound shatters the larger (>10 mm) solution droplets into smaller particles. Unfortunately, this method poses a real potential to contaminate the product with combustion byproducts and lacks direct control over the resulting particle size.

SUMMARY OF THE INVENTION

It is an object of the present invention to provide a precursor solution composition for making highly pure, fine barium-containing silicate glass powders and for BABS powders in particular.

It is another object of the present invention to present a process for preparing spherical particles of the BABS glass in the 0.1 to 10 micrometer size range with ability to control upper and lower particle size limitations.

In accordance with these and other objectives of the invention that will become apparent from the description herein, the invention relates to a process for preparing a stable BABS precursor solution that comprises:

mixing a barium source selected from the group consisting barium nitrate, barium hydroxide, and barium acetate; boric acid; and aluminum nitrate to form a mixture, heating said mixture to dissolve any remaining solids, adding colloidal silica to obtain a precursor solution, wherein the foregoing ingredients are mixed in appropriate proportion to obtain a barium aluminoborosilicate powder with a composition of about 50% $SiO_2$, 8% $Al_2O_3$, 9% $B_2O_3$, and 33% BaO.

A process for preparing barium aluminoborosilicate powder according to the invention includes the steps of:

atomizing a stable precursor solution of ingredients necessary to form barium aluminoborosilicate glass into a mixture of fine droplets and oversized droplets and carrying said mixture in a carrier gas;

separating the oversized droplet stream from a fine droplet stream based on differences in inertia between said fine droplets and said oversized droplets; concentrating the fine droplets in a virtual impactor; and pyrolyzing said fine droplets to form aluminoborosilicate powder.

The precursor solution of the invention is sufficiently stable to permit the economic use of spray pyrolysis techniques to make fine, spherical powders of high purity with sufficiently uniform refractive index values (preferably about 1.577) to allow use of the powder in dental composites.

DETAILED DESCRIPTION OF THE INVENTION

The invention relates to a process for making BABS powders from an atomized precursor solution containing colloidal silica, a water soluble source of barium, boric acid, and aluminum nitrate. Preferably, the precursor solution is formed by mixing the appropriate proportions of ingredients to obtain a BABS powder having a final composition of 50% $SiO_2$, 8% $Al_2O_3$, 9% $B_2O_3$, and 33% BaO following atomization and pyrolysis.

The colloidal silica source can be from a number of commercially available sources. The preferred source is a neutral colloidal silicon dioxide suspension in deionized water that available under the trade name LUDOX TMA.

The water soluble barium source is preferably a salt selected from the group consisting of barium nitrate (Ba $(NO_3)_2$), barium hydroxide (Ba$(OH)_2$), or barium acetate. Ba $(CH_2COOH)_2$).

Boric acid is commercially available in a variety of concentrations and purities. Preferably, reagent grade boric acid is used to minimize contaminants that might hinder suitability for use in dental composites.

The precursor solution of the invention is characterized by a slightly milky white color and freedom from precipitates.

A variety of mixing techniques can be used to form a thoroughly mixed, homogeneous liquid solution. Suitable mixing techniques includes high shear stirring, paddle agitation, stator blades, nozzles, etc.

After mixing, the liquid precursor solution is formed into fine droplets, classified for size, and pyrolyzed into fine powders. An ideal droplet generation system will produce droplets with a low gas to liquid ratio dictated by an aerosol coagulation limit i.e. approximately $10^7$ particles/cm$^3$. Most pneumatic nebulizers produce a much lower concentration of about $10^5$ particles/cm$^3$. A particularly preferred method for forming the desired droplets uses a high frequency (about 1–3 MHz) ultrasonic nebulizer. Ultrasonic nebulizers are commercially available, scalable, and desirable because no gas is used in the atomization step. What gas is used is only used in quantities sufficient to transport the atomized particles from the ultrasonic plate of the nebulizer through a size classifier, and into the pyrolysis chamber.

Particle generation will produce particles spanning a spectrum of sized from undersized to oversized with a range of desired aerosol droplet sizes therebetween. One or more size classifiers and separators can be used to eliminate either the undersized, oversized, or both from the aerosol stream before introduction to the pyrolysis chamber.

Figure 4:
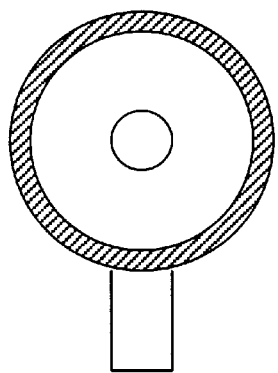
FIGS. 3 and 4 illustrates a virtual impactor for removing undersized droplets and concentrating aerosol sprays.

Size classification can be performed in a number of ways with cyclones, screens, etc. A particularly preferred method of classification includes an oversized droplet separator (FIG. 2) and an undersized droplet separator (FIGS. 3 and 4) disposed in either order but preferably disposed to remove the oversized droplets first.

Figure 1:
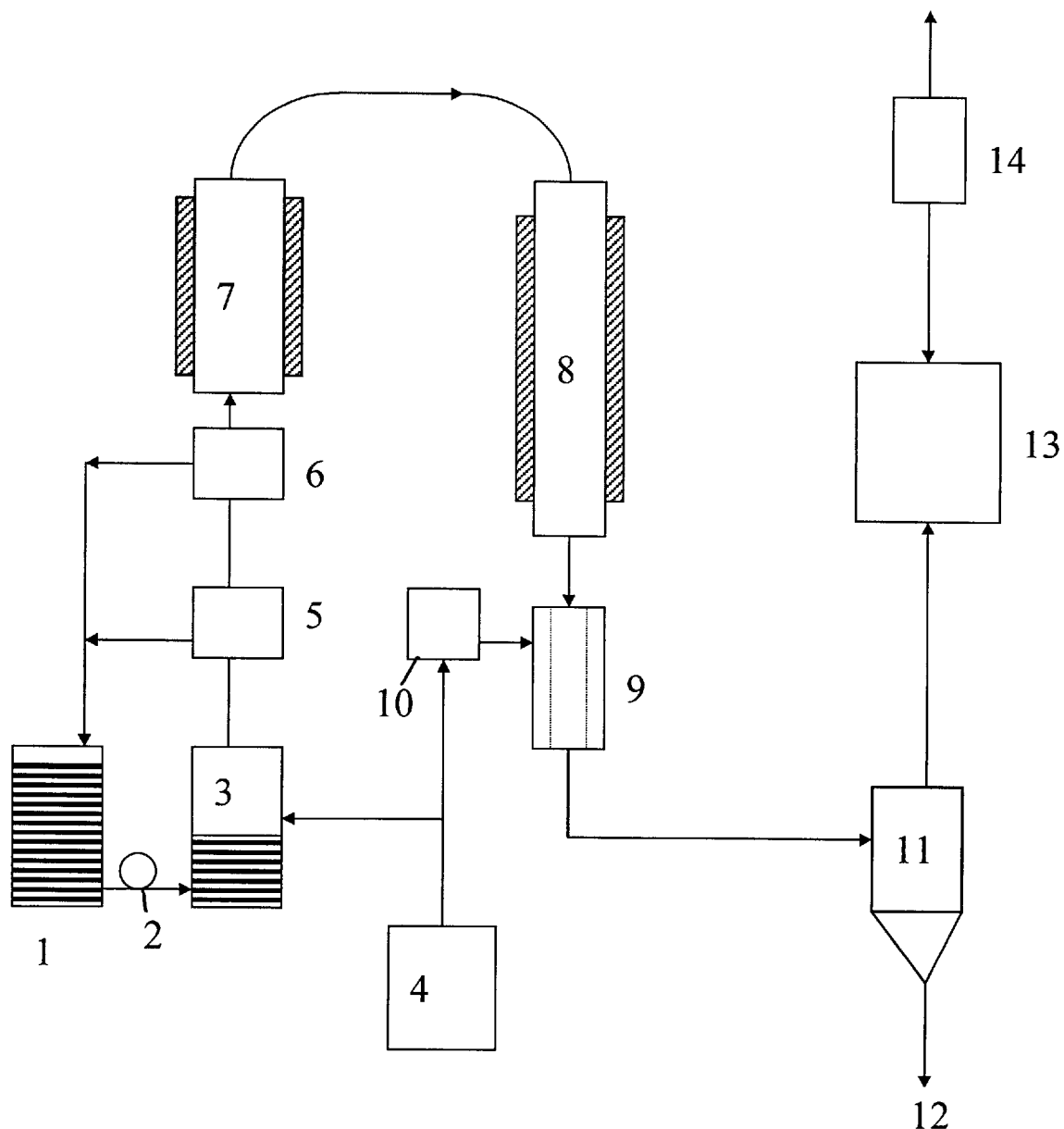
FIG. 1 depicts a process for making high purity powders of the ingredients for producing BABS glass according to the process of the present invention.
Figure 2:
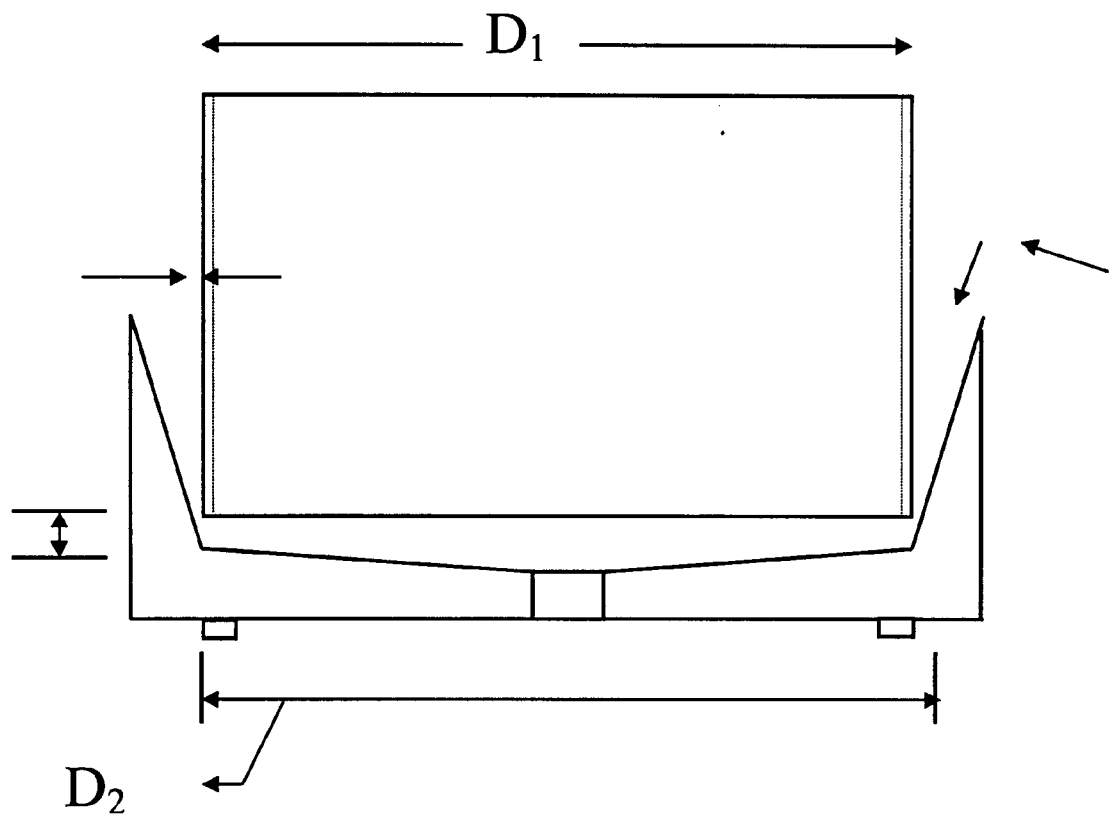
FIG. 2 depicts an in-line adjustable large droplet separator.

The oversized droplet separator of FIG. 2 relies on inertial differences to separate the undersized and desired aerosol droplets from the undesired aerosol droplets. The desired droplet size range is calculated from the desired glass particle range by the following relation between the droplet size $D_d$ and the glass particle size $D_p$:

$$\text{mass of glass material in droplet} = C \cdot \rho_d \cdot D_d^3 = \rho_p \cdot D_p^3$$

wherein

C is the concentration of the glass material in the solution (g. glass/g. solution), $\rho_d$ and $\rho_p$ are the solution density and glass particle density, respectively (g/cc).

Details of the oversized droplet separator are shown in FIG. 2. The rejected particle size limit may be set by adjusting the gap width, "W", between the outer cup and the inner cylinder. Droplets that have a size larger than desired are collected in the cup and drained back to the solution reservoir tank.

The upper size bound may be changed also by adjusting the carrier gas flow rate, Q as well as the gap "w". They are related by the following equations $$w = \tfrac{1}{2}(D_2 - D_1)$$

$$Q = \tfrac{1}{4}\Pi(D_2^2 - D_1^2)$$

The boundary particle size for separation is given calculated from the dimensionless parameter for inertial separation referred to as the Critical Stokes Number, $N_{stkc}$ $$N_{stkc} = (D_d^2 \cdot \rho_p \cdot C_c \cdot U)/(18 \cdot \mu \cdot w)$$

wherein:

$D_d$ is the droplet size corresponding to the upper size bound, $\rho_p$ is the particle density (g/cc)

$C_c$ is the Cunningham gas slip correction and may be assumed to be unity of droplets larger than 1 $\mu$m, U is the gas velocity, and $\mu$ is the gas viscosity.

Figure 3:
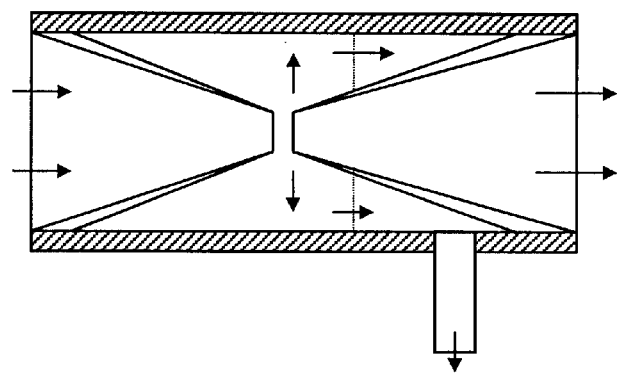

The fine mist exiting the oversized droplet separator may be further separated into undersized and desired size streams with an aerosol classification device, such as a virtual impactor. A preferred design is illustrated in FIGS. 3 (side view) and 4 (end view). Such separators rely on a transverse withdrawal current over a gap between converging and diverging nozzles through which flows the feed of carrier gas and aerosol particles.

The inline flow through the nozzles contains all particles larger than the selected size and only a fraction of the smaller droplets equal to the ratio of the minor to major flow. The transverse flow removes undersized aerosol particles through a lateral discharge port. Thus, by adjusting the inline to transverse flow ratio to a value, e.g., about 10:90, the net effect is to eliminate 90% of the smaller particles and concentrate the inline flow by a factor of 10. The transverse stream of undersized particles is recycled to recover the liquid solution to the feed tank. The preferred virtual impactor follows, with some modifications, is a design described by H. M. Chien and D. A. Lundgren (Aerosol Science and Technology, Vol. 23, pp 510–520, 1995.).

The resulting flow of desired size droplets is then conveyed to a pyrolyzer operating at a suitably high temperature to form a fine, white product powder having a refractive index within the range of 1.5–1.6. Suitable temperatures are within the range of 1000°–1600° C. with a temperature of about 1400° C. being particularly useful.

A variety of powder collection techniques can be used. Examples include a cyclone, an electrostatic precipitator, or a barrier filter.

The overall sequence of one embodiment of the present manufacturing process is shown in FIG. 1 where precursor solution is stored in tank 1. Pump 2 is used to transfer the feed solution to the atomizer section 3 containing an array of nozzles based on ultrasonic (acoustic) or pressure atomization principle. The resulting fine spray is transported with a carrier gas 4 to inertial separators 5 and 6 where droplets both larger and smaller than predetermined sizes from 0.1 to several micrometers are captured and recirculated back to the solution tank.

Separation of oversized and undersized droplets from desired size droplets is preferably accomplished by using two inertial separators 5 and 6, respectively. Desired size droplets leaving the separators are dried in a drying section 7 at a controlled rate so as to not produce solute particles with crust and hollow cores, or to shatter the droplets. The specific rate is readily determinable by those with no more than an ordinary level of skill in the art with no more than routine tests. In general, an appropriate drying rate is within the range of 30° to about 50° C./sec. The temperature is gradually raised as the droplets travel upwards in the drying section to just above the temperature necessary to completely evaporate the solvent such as water.

The dried solute particle then flow into ceramic tube furnace 8 where it is pyrolyzed at a high temperature within the range of 1000°–1600° C. The aerosol particles are converted to generally spherical glass particles and carried by the process gases to cooling section 9. In section 9, a cold gas from compressed gas source 10 is supplied to an outer jacket surrounding the transportation conduit and transpires radially inward through the perforated or porous pipe wall. This inward flow of the cooling gas counteracts movement of the product particles caused by thermophoresis from the hot gas to the pipe wall. As a result, deposition and loss of the product on the pipe walls is eliminated.

The specific cold gas pressure required to counteract thermophoresis effects will depend on the particular porosity of the perforated transport conduit. The lateral gas injection rate is maintained at a value equal to or greater than the effective deposition velocity for thermophoresis, gravity, or any other significant deposition forces acting on the dried particles. Such calculations are readily performed by those in the art for any particular combination of carrier gas velocity, aerosol particle, and heater orientation.

Thermophoresis of particles, i.e., movement of fine particles toward the reactor walls, results from high temperature gradients between the hot core and the cooler walls of the ducts. In micrometer and submicrometer size particles, thermophoresis is significant. Effective deposition velocities range in magnitude to several millimeters per second. Thermophoresis may account for losses of up to 20% in typical reactors. Methods are needed to reduce or eliminate such losses.

Deposition of particles on the ducts of the reactor by thermophoretic and other mechanisms leads to considerable loss of valuable product and also down time in processing for removal of the deposit. Ranade et al. (1974) shows that a transpiration flow inwards from cylindrical tubes can reduce or eliminate completely the wall deposition from gravitational, diffusive and inertial mechanisms if the transpiration velocity is greater than the net effective deposition velocity.

Collection device 11 can be any device suitable for the collection of fine powders, but is preferably either a fabric filter or an electrostatic precipitator. The collected particles are shaken or scraped into a hopper and may be removed without stopping the process with gas through a valve with gas interlock 12. The carrier gases are further treated if necessary to remove water vapor by condensation 13 and to scrub any residual particles before being exhausted by blower 14.

EXAMPLES

The following examples illustrate the use of the precursor and the process to produce BABS particles in the desirable size range.

Example 1

Procedure: The following procedure illustrates proportions of compounds to make the BABS glass powder.

To make 25 g. of BABS powder, the following precursor chemicals were mixed with 430.46 g. of distilled water to obtain a 5 wt % glass solution.

1) 36.76 g of 34 wt. % neutral colloidal $SiO_2$ solution 2) 14.72 g of $Al(NO_3)_3$. $9H_2O$ 3) 4.0 g of $H_3BO3$ 4) 14.06 g of $Ba(NO_3)_2$ First the ingredients 2, 3 and 4 were mixed and stirred with water for 20 to 30 minutes. The solution was heated to dissolve any remaining solids. When all the solids are dissolved, ingredient 1, the colloidal $SiO_2$ solution was slowly added to obtain a slightly milky white solution.

The solution was then fed into an ultrasonic transducer chamber, where it was atomized into a dense cloud of fine droplets. The large particle separator was used to remove droplets larger than 9 micrometers. A compressed air stream (5 LPM) was used as the carrier gas to carry the droplet cloud into a drying column (at 120° C.) to evaporate water from the droplets. It was then pyrolyzed in flight in a 1400° C. furnace. After the stream leaving the furnace was cooled to about 120° C., the product was collected in a filter bag.

The BABS powder obtained from this process was white in color. Observations under a Scanning Electron Micrograph (SEM) showed perfectly spherical particles, with diameters less than 1 micrometer to particles as high as 4 microns. The final composition of the BABS powder is approximately, 50 % $SiO_2$, 8% $Al_2O_3$, 9% $B_2O_3$, and 33% BaO.

Example 2

Following the recipe in Example 1, four solutions representing 10, 5, 1 and 0.3% BABS were prepared and powder samples were produced at conditions listed in Table 1. The large droplet separator was used to limit precursor solution droplets to 6 microns. The median particle size could be varied from about 0.5 $\mu$m to 1.5 $\mu$m as indicated in the Table 1, where $d_{10}$, $d_{50}$, and $d_{90}$ represent the diameters at which respectively 10, 50 and 90 percent of the particle volumes are smaller than the stated value.

TABLE 1

Effect of Precursor Concentration on Product Particle Size

| Solution Concentration BABS % | Furnace Temperature, Deg C | Carrier Air flow, Liters/min. | $d_{10}$ On Volume Basis | $d_{50}$ On Volume Basis | $d_{90}$ On Volume Basis |
|---|---|---|---|---|---|
| 0.3 | 1400 | 10 | 0.39 | 0.59 | 1.19 |
| 1 | 1400 | 10 | 0.39 | 0.78 | 1.30 |
| 1 | 1400 | 5 | 0.59 | 1.19 | 2.73 |
| 5 | 1400 | 5 | 0.72 | 1.34 | 2.97 |
| 10 | 1400 | 5 | 0.76 | 1.39 | 2.84 |

The results show that the particle size may be adjusted by changing the solution concentration.

We claim:

1. A process for preparing a stable precursor solution for spray pyrolysis production of barium aluminoborosilicate glasses comprising:

mixing a barium source selected from the group consisting of barium nitrate, barium hydroxide, and barium acetate; boric acid; and aluminum nitrate to form a mixture, heating said mixture to dissolve any remaining solids, adding colloidal silica to obtain a precursor solution, wherein the foregoing ingredients are mixed in appropriate proportion to obtain a barium aluminoborosilicate powder with a composition of about 50% $SiO_2$, 8% $Al_2O_3$, 9% $B_2O_3$, and 33% BaO.

2. The process according to claim 1 wherein the resulting solution has no precipitate.

3. The process for preparing barium aluminoborosilicate powder comprising:

atomizing a stable precursor solution of ingredients necessary to form barium aluminoborosilicate glass into a stream containing a mixture of undersized droplets, desired size droplets, and oversized droplets carried by a carrier gas;

separating the oversized droplets and undersized droplets from desired size droplets based on differences in inertia between a stream of said desired size and streams of undersized droplets and oversized droplets;

drying said desired size droplets at a rate sufficient to avoid hollow particles; and pyrolyzing said desired size droplets to form pyrolyzed barium aluminoborosilicate powder.

4. The process according to claim 3 further comprising:

cooling and transporting the barium aluminoborosilicate powder by adding a cooling gas radially inwardly through porous walls of a transfer conduit.

5. The process according to claim 3 wherein the precursor solution comprises neutralized colloidal silicon dioxide; a barium source selected from the group consisting of barium nitrate, barium hydroxide and barium acetate in appropriate proportions to obtain a barium aluminoborosilicate powder with a composition of about 50% $SiO_2$, 8% $Al_2O_3$, 9% $B_2O_3$, and 33% BaO.

6. The process according to claim 3 wherein the precursor solution is atomized into a furnace.

7. The process according to claim 3 where a cooling gas is introduced radially inwardly into a transport conduit conveying pyrolyzed barium aluminoborosilicate powder.

8. The process according to claim 3 wherein said powder is collected on a filter or an electrostatic precipitator.

9. A process according to claim 3 wherein said oversized droplets are larger than 9 $\mu$m.

10. A process according to claim 3 wherein said undersized droplets are less than 0.3 $\mu$m.

11. A process according to claim 3 wherein pyrolyzing the desired size droplets forms said powder and consists essentially of 0.1–2 $\mu$m spherical particles of barium aluminoborosilicate glass.

12. A process according to claim 3 wherein the atomizing is performed with an ultrasonic nebulizer.

13. A process according to claim 3 wherein undersized droplets are separated by a transverse withdrawal current over a gap between converging and diverging nozzles through which flows said mixture of droplets in a carrier gas.

14. A process for producing a barium aluminoborosilicate powder useful in a dental composite by the steps comprising:

atomizing a stable precursor solution of ingredients necessary to form barium aluminoborosilicate glass into a stream of aerosol droplets in a carrier gas, separating undersized and oversized droplets from desired size droplets;

pyrolyzing said desired size droplets to form glass particles in a hot carrier gas flowing through a conduit; and introducing a cooler gas radially into said hot carrier gas at a rate sufficient to counteract movement of said glass powder toward walls of said conduit.

15. A process according to claim 14 wherein said oversized droplets are collected and recycled for the atomizing step.

16. A process according to claim 14 wherein undersized droplets are separated by a transverse withdrawal current over a gap between converging and diverging nozzles through which flows said mixture of aerosol droplets in said carrier gas.

* * * * *